Dec. 5, 1961 G. J. WASKO 3,012,186
VEHICLE OPERATED GENERATOR UNIT
Filed Aug. 17, 1959 4 Sheets-Sheet 2

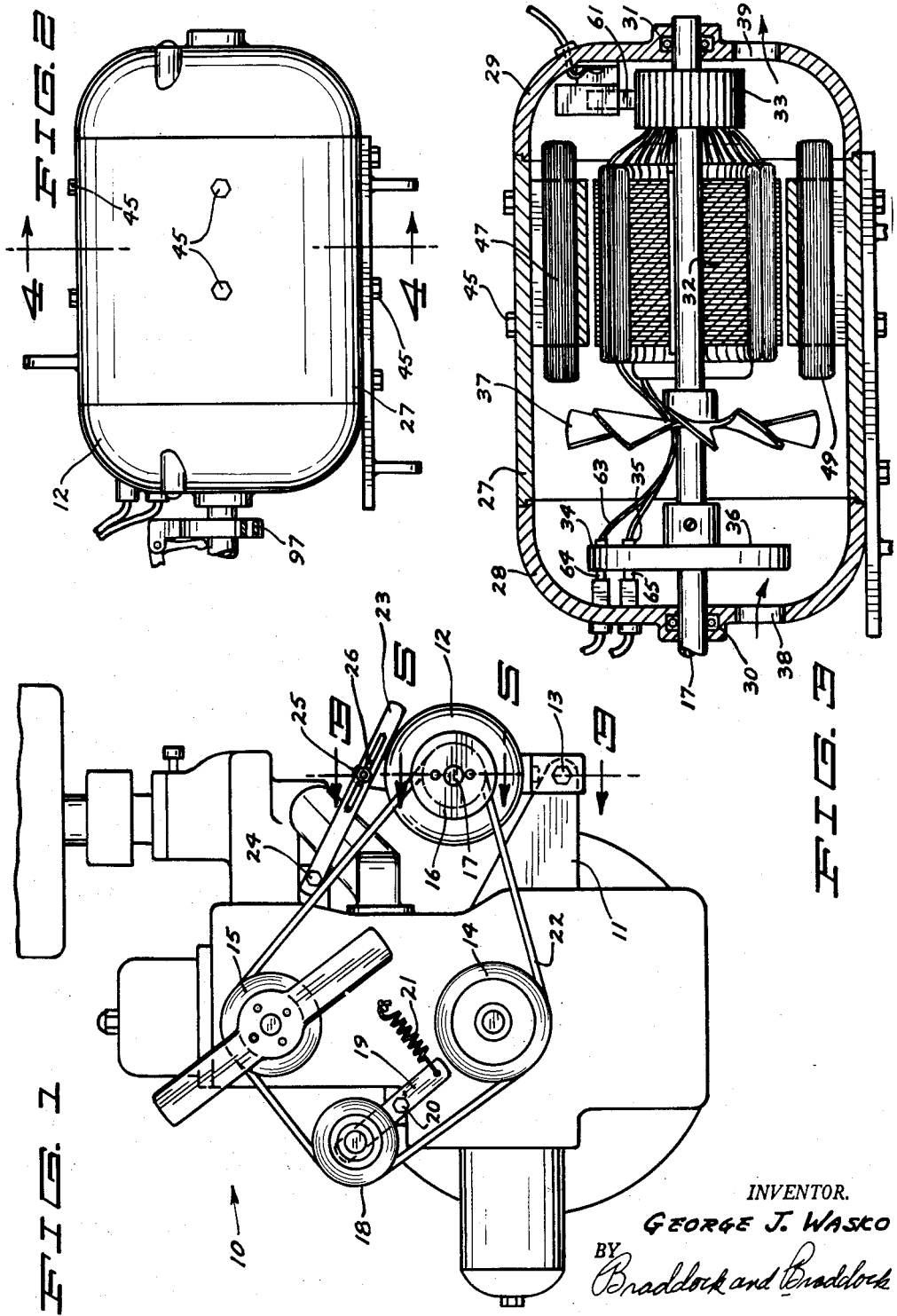

INVENTOR.
GEORGE J. WASKO
BY
Braddock and Braddock
ATTORNEYS

Dec. 5, 1961  G. J. WASKO  3,012,186
VEHICLE OPERATED GENERATOR UNIT
Filed Aug. 17, 1959  4 Sheets-Sheet 3

INVENTOR.
GEORGE J. WASKO
BY
Braddock and Braddock
ATTORNEYS

Dec. 5, 1961 G. J. WASKO 3,012,186
VEHICLE OPERATED GENERATOR UNIT
Filed Aug. 17, 1959 4 Sheets-Sheet 4

INVENTOR.
GEORGE J. WASKO
BY
Braddock and Braddock
ATTORNEYS

United States Patent Office 3,012,186
Patented Dec. 5, 1961

3,012,186
VEHICLE OPERATED GENERATOR UNIT
George J. Wasko, Lakefield, Minn., assignor to W. C. Generator Co., Worthington, Minn., a corporation of Minnesota
Filed Aug. 17, 1959, Ser. No. 834,081
5 Claims. (Cl. 322—90)

This invention has relation to a vehicle operated generator unit and more particularly to a combination alternating and direct current generator to be driven by the fan belt of an automotive engine.

In a generator made according to the present invention, a direct current winding is situated in slots of an armature in spaced relationship to the generator drive shaft while an alternating current winding is situated in said slots immediately on top of said direct current winding. The leads from each of the coils of the direct current winding are brought out to a first end of the armature to a direct current commutator, while the leads from the alternating current windings are brought out to a second end of said armature and are fixedly attached to slip rings fixedly mounted on and concentric with the drive shaft. Four field windings on a stator of the generator receive their excitation from commutator brushes of the direct current portion of the generator.

In order to assist in maintaining satisfactory voltage and frequency control at the desired output loads, it is very helpful to provide means whereby the generator can be driven at a constant speed or at least within some definite speed variation limits. This can be done in a number of ways, but a governor-controlled, variable pitch drive pulley is disclosed herein as one effective way to obtain substantially constant speed on a generator drive shaft during a considerable speed variation of the automotive drive motor.

In the drawings,

FIG. 1 is a front elevational view showing a generator made according to the present invention installed on an automotive engine;

FIG. 2 is an enlarged side elevational view of the generator of FIG. 1 as seen from the right in that figure;

FIG. 3 is an enlarged vertical sectional view taken on the line 3—3 in FIG. 1;

Figure 4:
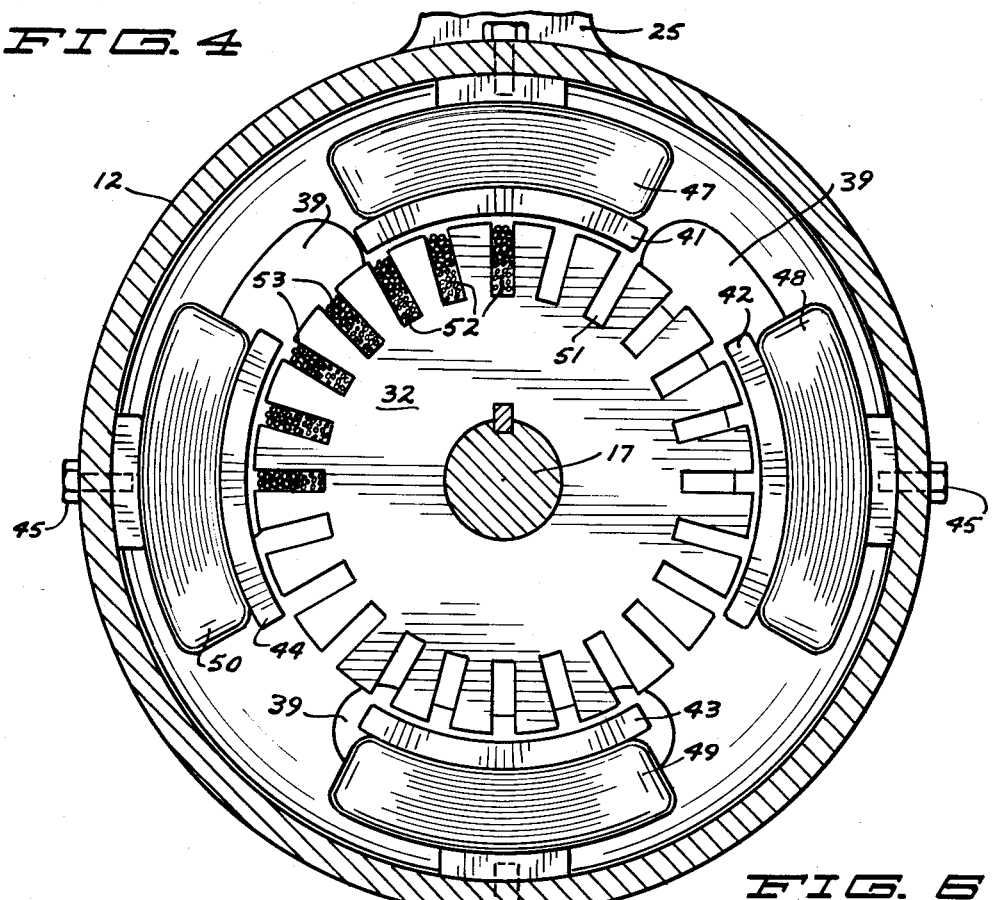
FIG. 4 is an enlarged vertical sectional view taken on line 4—4 in FIG. 2.

Refering to the drawings and the numerals of reference thereon, an automotive engine, denoted generally at 10, has a generator mounting bracket 11 extending outwardly therefrom to pivotally support a generator 12 made according to the present invention as at 13. A crank shaft pulley 14 and a fan pulley 15 are mounted on the automotive engine in the usual manner, and a generator pulley 16 is mounted on a generator shaft 17 of the generator 12. A fan belt takeup and tensioning pulley 18 is rotatably mounted on a takeup arm 19 which is pivotally mounted with respect to said automotive engine 10 as at 20. A tension spring 21 tends to cause the takeup arm 19 to move the tensioning and takeup pulley 18 in direction away from a line between the centers of crank shaft pulley 14 and fan belt pulley 15. A fan belt 22 runs in each of the pulleys 14, 15, 16 and 18. A slotted positioning arm 23 is pivotally mounted with respect to the automotive engine as at 24. A positioning lug 25 is integral with and extends upwardly from the case of the generator 12; and means 26 is provided for fixedly positioning said arm 23 and said lug 25 with respect to each other.

The generator pulley 16 is provided with a centrifugally acting means for increasing the pitch diameter of the generator pulley 16 in response to increased speed of rotation thereof and for decreasing pitch diameter of said pulley responsive to decreasing speed of rotation. The mechanism for accomplishing this speed regulation of the generator shaft 17 will be detailed later in the specification. The tensioning and takeup pulley 18 compensates for this change in pitch diameter of generator pulley 16 to insure that the fan belt 22 is maintained under sufficient tension at all times.

The generator 12 includes a housing 27, a first end bell 28, and a second end bell 29. The generator shaft 17 is mounted in a first bearing 30 in said first end bell and in a second bearing 31 in said second end bell. An armature 32 consisting of a plurality of slotted laminations is mounted on the shaft 17 in any usual manner, as is the commutator 33 at position inside of the second end bell 29. A pair of slip rings 34, 35 are concentrically mounted in spaced relation to each other on a disc 36 of non-conducting material, all to be concentric with the shaft 17. A fan 37 is fixedly mounted on the shaft 17 between the armature 32 and the disc 36. First end bell 28 is provided with a plurality of openings 38, while second end bell 29 is provided with a plurality of openings 39 to permit air to be drawn in through said first end bell, passed through the generator and out the second end bell under the action of the fan 37 during operation of the generator. Four pole-shoes 41, 42, 43 and 44 are each bolted to the generator housing 27 as at 45. Each of these shoes has a field winding supported in surrounding relationship thereto, said windings being identified as 47, 48, 49 and 50, respectively.

The direct current coils of the armature winding are situated in the bottom area of armature slots 51 in a particularly effective form of the invention. These wires are generally smaller in size than are the alternating current windings which are situated in the top portions of these armature slots 51. The direct current windings are indicated generally at 52 in FIG. 4, and the alternating current windings are indicated generally at 53 therein.

Figure 8:
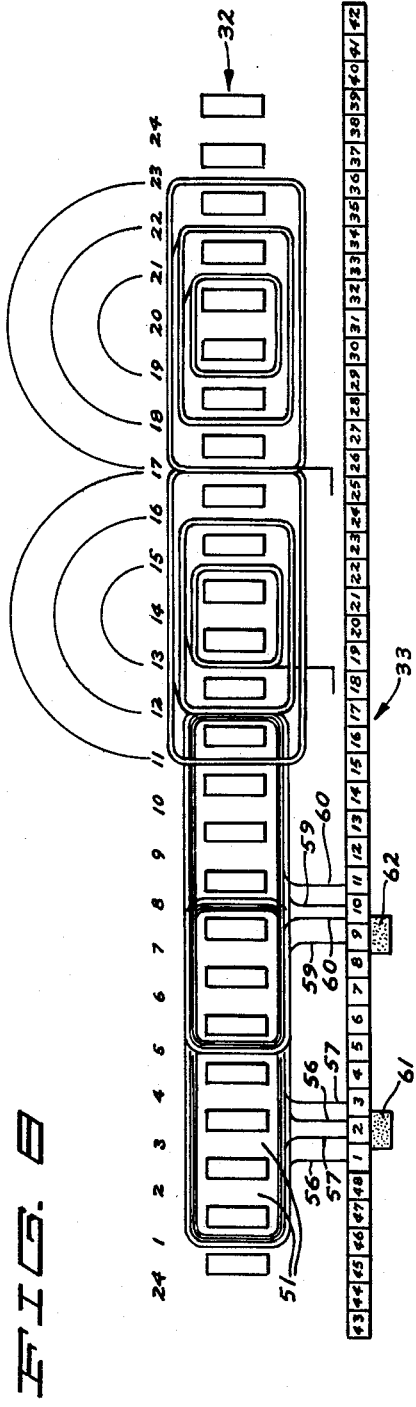
FIG. 8 is a schematic representation of a wiring diagram showing a typical portion of the direct current circuit of the armature and showing its relation to two poles of the alternating current circuit thereof.

A typical section of the direct current windings is illustrated to the left in FIG. 8. In describing this winding, specific values will be assigned to form a particular embodiment of the invention which has been found to be very satisfactory. Many other values could be used effectively. For example, an armature such as the armature 32 having 24 slots will be described in conjunction with the commutator, such as the commutator 33 having 48 bars. Each direct current winding has 6 turns lying in each slot for each of two different wires connected to two adjacent commutator bars. In one embodiment of the invention, No. 18 wire proves most satisfactory. The first of these coils is wound as follows: a line 56 is secured to the commutator bar numbered 1, and passes through the slot numbered 1 in a first direction and back through a slot numbered 8 in a second direction, through the slot 1 and back through the slot 8 and round and round through these slots until six total turns are accomplished. This line 56 is then secured to commutator bar numbered 2. The other half of this coil consists of the line 57 which is secured to the commutator bar numbered 2, also passes through slot 1 in said first direction, and slot 8 in said second direction and back and forth therethrough until six turns are accomplished and is then secured to commutator bar 3.

The next coil, although it is not shown, starts with a line secured to the commutator bar marked 3, passes through slots marked 2 and 9 sufficient times to make six turns, and is then fastened to the commutator bar marked 4. The second half of this coil is secured to the commutator bar marked 4, also passes through slots 2 and 9, and is secured to the commutator bar marked 5. This progression of coils continues until the next coil illustrated which is the fifth direct current coil, and consists of the line 59, which is secured to the commutator bar numbered 9, passes through slots 5 and 12 six times and is secured to the commutator bar marked 10. The other half of this coil consists of the line 60 which is secured to commutator bar marked 10, also passes through slots 5 and 12 six times and is secured to the commutator bar marked 11. These windings are continued around the entire circumference of the armature until the bottom portion 52 of each of the slots 51 is filled.

A pair of direct current brushes 61 and 62 are situated in fixed right angular relationship to each other in the end bell 29. In order to best distribute the load and give proper output, each of these brushes is of length to contact more than 1 commutator bar at a time. This is best seen in FIG. 8.

Figure 9:
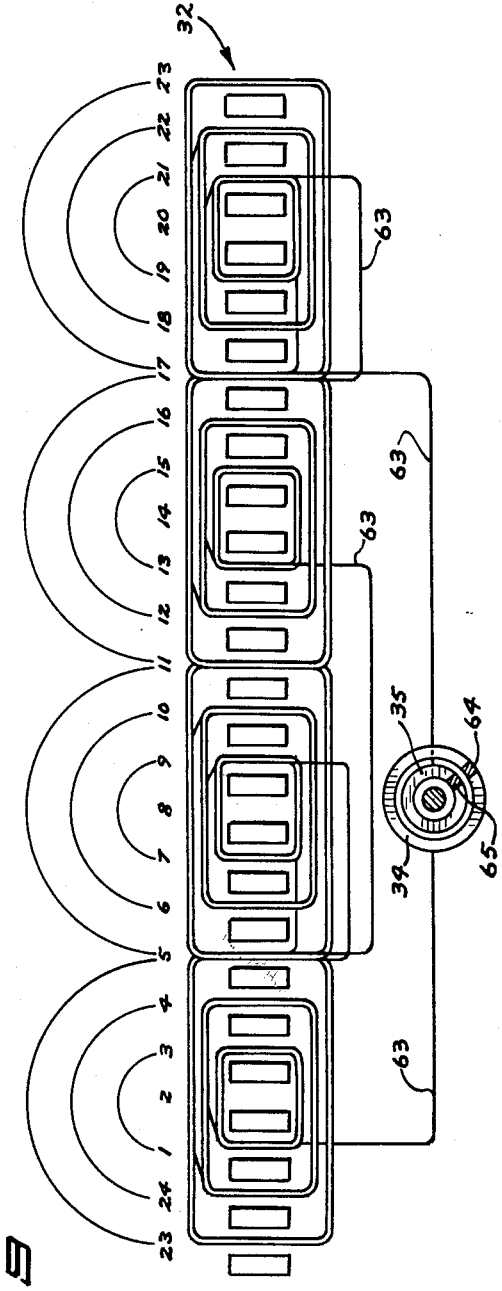
FIG. 9 is a representation of the complete alternating current circuit of said armature.

The relationship of the four alternating current windings to the slots 51 in armature 32 is best shown in FIG. 9. Here again, a specific construction of windings will be given as an example of a relationship which will work to give excellent results when used in conjunction with the direct current coils just described.

Each winding may, then, consist of three concentric coils per pole. A No. 16 wire may be used with good results.

As shown in FIG. 9, a first pole will be wound from a wire 63 which will be secured to slip ring 34 at an end of the generator adjacent first end bell 28. This wire 63 will pass through slot 1 in a first direction and back through slot 3 in a second direction until 21 turns are in place. After this last pass through slot 1, the wire 63 will pass through slot 4 in said second direction, and back through slot 24 in said first direction for a total of twenty-four turns. After the last pass through slot 24, the wire 63 will pass through slot 5 in said second direction and back through slot 23 in said first direction until a total of 12 turns is built up. After the last pass through slot 5, the first pole of the generator will be completed, and wire 63 will pass through slot 9 in said first direction back and through slot 7 in said second direction, and back and forth through 9 and 7 until a total of 21 turns are accomplished to form the smallest coil of the second winding. After passing through the slot 9 for the 21st time, the wire 63 will pass back through slot 6 in said second direction and forth through slot 10 in said first direction until a total of 24 turns is accomplished to form the middle coil of said second winding. After passing for the last time through slot 10, the wire 63 will pass in said second direction through the slot 5, in said first direction through the slot 11, and back and forth through 5 and 11 until 12 turns is completed to finish the second winding of the alternating current armature circuit.

After passing through the slot 5 for the last time, this wire 63 will pass in said first direction through the slot 13, and in said second direction through the slot numbered 15 and back and forth through 13 and 15 until 21 turns of the smallest coil of the third alternating current winding has been completed; will come from its last pass through the slot 13 in said first direction to pass through slot 16 in said second direction and slot numbered 12 in said first direction and back and forth through 16 and 12 for 21 turns. After passing through the slot 12 for the last time, the wire will pass through the slot 17 in said second direction and the slot 11 in said first direction sufficient times to form 12 turns.

When these turns have been formed, and after the wire has passed through the slot 17 for the last time in said second direction, it will pass through the slot 21 in said first direction, and back through the slot 19 in said second direction sufficient times to form 21 turns in the smallest coil of the 4th winding of the invention. After leaving slot 21 the wire will pass in said second direction through slot 18 and through slot 22 in said first direction sufficient times to form the 24 turns of the middle coil of said 4th winding; and from slot 22, through slot 17 in said second direction and slot 23 in said first direction sufficient times to form the 12 turns of the outer coil. After passing through the slot 17 in said second direction for the last time, the wire 63 passes to be affixed to slip ring 35.

Figure 7:
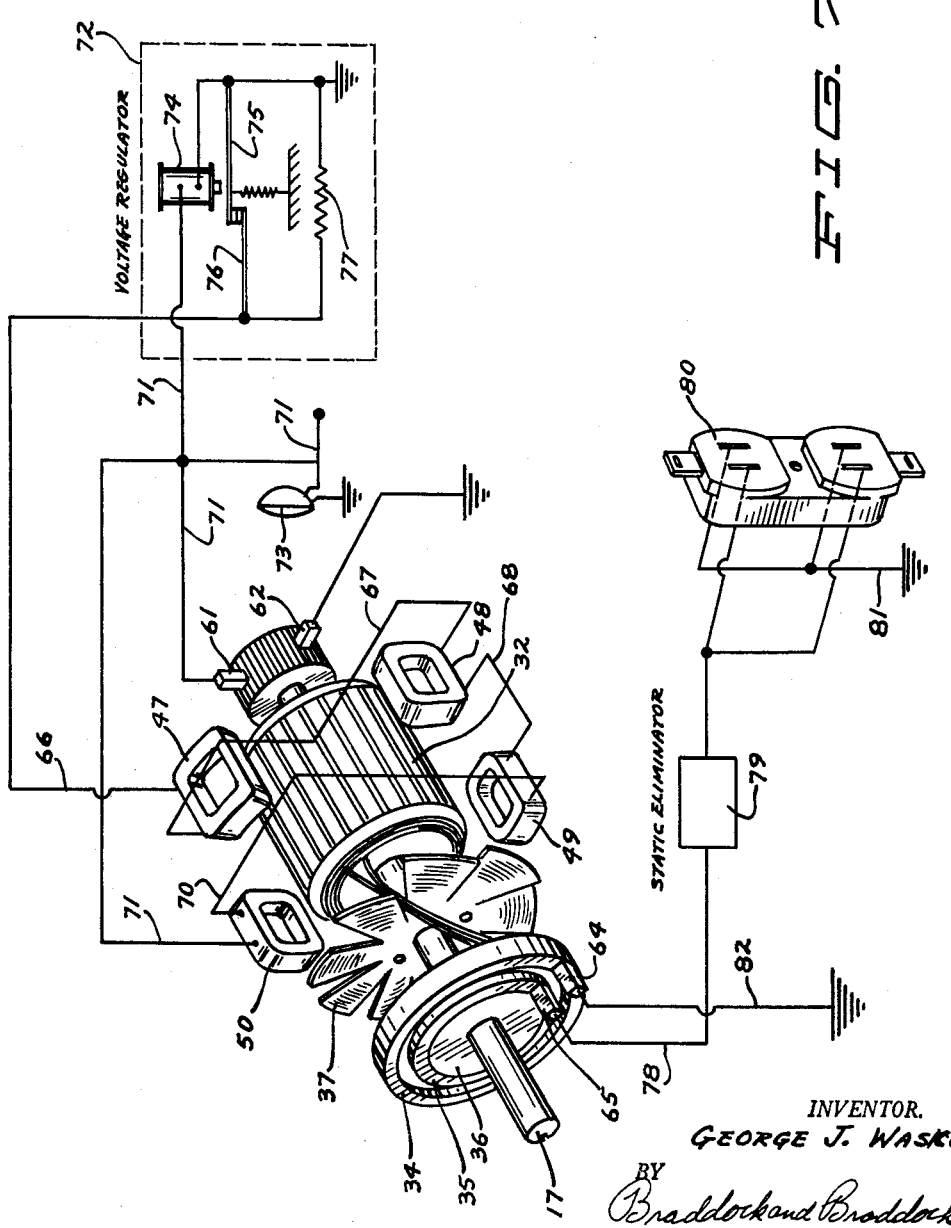
FIG. 7 is a diagrammatic representation of the various elements associated with the rotating part of the generator and of the field windings and a schematic representation of the electrical circuit of the invention.

As indicated diagrammatically in FIGS. 7 and 9, and as perhaps best seen in FIG. 3, a pair of alternating current brushes 64 and 65 are fixedly mounted with respect to said first end bell 28 to be in sliding contact with said slip rings 34 and 35 respectively.

As will be evident from the circuit diagram of FIG. 7, the output of both the alternating current windings and the direct current windings will be affected and controlled by the excitation present in the field windings 47, 48 and 49 and 50. These field windings are constituted as coils of 350 turns each of No. 18 wire in the specific embodiment of the invention set out. As disclosed in FIG. 7, these coils are hooked in series with each other from a line 66 to coil 47, from coil 47 through a line 67 to coil 48, through a line 68 to coil 49, through a line 70 to coil 50, and through a line 71 to direct current brush 61. This line 71 also passes to a voltage regulator 72 and to various locations for use for direct current throughout the car including, for example, headlight 73.

The voltage regulator 72 will include a relay coil 74 and relay contacts 75 and 76 as well as field current dropping resistor 77. The line 71 is connected to one side of said relay coil 74, while the other side of said coil is connected to ground. The line 66, and consequently the other end of the series field circuit just described is attached to one of the relay contacts 76 while the other contact 75 is grounded. The resistor 77 is connected across these relay contacts 75 and 76, and these contacts are maintained normally in closed connection with respect to each other.

The operation of this voltage regulator 72 is such that when the voltage generated in the direct current portion of the circuit and appearing between the brush 61 and the brush 62 exceeds a certain predetermined value, relay coil 74 will cause relay contact 75 to be broken away from contact 76 so that field current dropping resistor 77 will be placed in series with the remainder of the field circuit to the end that less excitation is present, and the voltage generated in the direct current portion of the generator will be reduced.

This reduction in field excitation, however, will obviously also have the effect of limiting and reducing the voltage output at the brushes 64 and 65 in the alternating current portion of the circuit.

The circuit just described has been found to be remarkably effective in maintaining a stabilized output voltage for both the direct current and alternating current portions of the combined generator. The alternating current available at the brushes 64 and 65 can be utilized by providing alternating current line 78 leading from the brush 65, through a suitable static eliminator 79 to a suitable alternating current outlet plug 80. In the usual instance, and typically in automotive usage, one of the contacts of the outlet plug 80 will be grounded as through the line 81 and a connection 82 will be provided between the brush 64 and ground.

While the voltage regulation of the device just described is quite satisfactory, those skilled in the art will recognize that the particular generator described will require a speed of rotation of 1800 revolutions per minute if an output of 60 cycles is to be obtained on the alternating current windings.

Since much equipment is sensitive to the frequency of the alternating current power source, a governor apparatus is provided to make possible fairly close control over the speed of rotation of the generator shaft 17 and consequently fairly good control over the output frequency output of the generator. This device is best disclosed in FIGS. 5 and 6. In these figures it will be seen that the generator pulley 16 includes a fixed half 90 fixedly mounted on shaft 17 as at 91 and a slidable half 92 slidable on the shaft 17 but keyed thereto as at 93. A plurality of springs 94 acting against end plugs 95 and through openings 96 in said fixed half 90 of pulley 16 tend to move the slidable half 92 of said pulley away from said fixed half 90.

Figure 5:
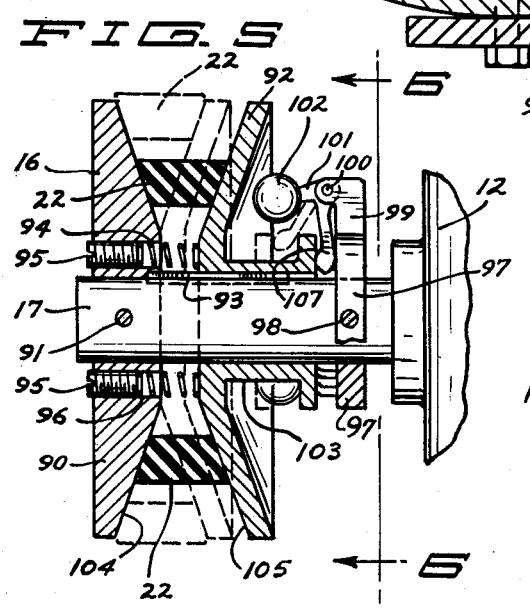
FIG. 5 is an enlarged vertical sectional view taken on the line 5—5 in FIG. 1.
Figure 6:
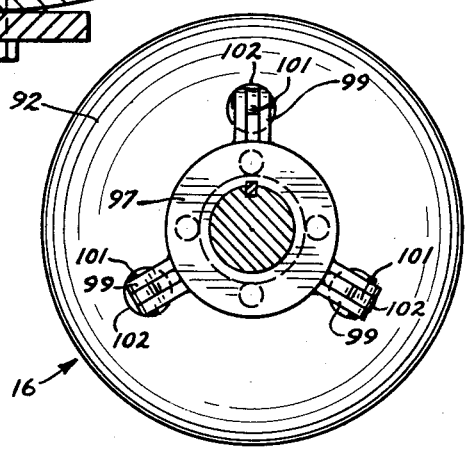
FIG. 6 is a vertical sectional view taken on the line 6—6 in FIG. 5.

A collar 97 is fixedly mounted on the shaft 17 as at 98, and includes upstanding lugs 99 which pivotally support as at 100, a governor crank arm 101. This crank arm has a governor mass 102 situated in spaced relation from said shaft 17 and from said pivot point 100, and has a pulley control arm 107 in bearing relationship to a hub 103 of the slidable pulley 92. As previously stated, the fan belt 22 rides between the inclined operating surfaces 104 and 105 of pulley halves 90 and 92 respectively. The action of this pulley governor or constant speed pulley apparatus will be such that when the generator is first put into operation upon operation of the engine 10, fan belt 92 will ride in a minimum pitch diameter position of the pulley as seen in FIG. 5. When the speed of rotation of the generator shaft 17, and consequently the collar 97 and governor mass 102 approaches 1800 r.p.m., the outward centrifugal action of this mass, working about pivot point 100 on the end of the crank arm 101 adjacent the hub 103 will be sufficient to cause springs 94 to begin compressing. This will cause the slidable half 92 of pulley 16 to move toward the fixed half 90, to cause the fan belt to ride up in the "groove" and to effectively lengthen the pitch diameter of the pulley. This action will be compensated for by a pulling of the fan belt tensioning and takeup pulley 18 in direction toward the fan against action of spring 21. As this effective pitch diameter is increased, the speed of the pulley will be proportionately decreased with respect to the lineal speed of the fan belt, and in this manner a speed of rotation of the generator shaft 17 can be maintained in an area of 1800 r.p.m. even though the corresponding engine speed is increased substantially thereover.

What is claimed is:

1. An electrical generator consisting of a generator casing, a generator shaft rotatably mounted in said casing, a single, unitary slotted armature fixedly mounted on said shaft to rotate therewith, a plurality of pole shoes fixedly mounted with respect to said casing in surrounding relationship to said armature, a field winding on each of said pole shoes, a direct current commutator mounted on said shaft, a plurality of direct current output windings located in the slots of said armature, each of said direct current output windings being operably connected to said commutator and only to said commutator, a plurality of direct current commutator brushes fixedly mounted with respect to said casing and in operational contact with said commutator, an electrical connection between said commutator brushes and said field windings, a plurality of direct current output leads electrically connected directly to said commutator brushes and extending outwardly to a location for use of direct current energy therefrom, a plurality of alternating current output windings, said alternating current output windings being situated in the slots of said armature in overlapping relationship to said direct current output windings, a plurality of alternating current output slip rings fixedly mounted concentric with respect to said generator shaft, direct electrical connections between said alternating current output windings and said slip rings and only between said windings and said rings, a plurality of alternating current output brushes fixedly mounted with respect to said casing and in operational contact with said slip rings, and a plurality of alternating current output leads electrically connected to said alternating current output brushes.

2. The combination as specified in claim 1 and means responsive to the direct current voltage across said direct current output leads for regulating the strength of the field windings.

3. The combination as specified in claim 1 wherein there are four equally spaced alternating current armature windings wound on said armature, wherein there are four pole shoes and a field winding associated with each, and wherein at least two of said field windings are connected in series with each other and are electrically connected across said commutator brushes.

4. The combination as specified in claim 3, a field current dropping resistor in series with said field windings, a pair of relay contacts each connected to one end of said resistor, and a relay coil effectively connected across said commutator brushes to open said relay contacts in response to increase in voltage across said commutator brushes above a predetermined level and to allow said contacts to close in response to decrease in said voltage below a predetermined level.

5. The combination as specified in claim 3 wherein said armature includes a total of 24 slots and wherein said alternating current armature windings are connected in series with each other and each include an inner coil of approximately 21 turns wound through the two outside slots of three adjacent slots, an intermediate coil of approximately 24 turns wound through two slots each immediately adjacent and spaced outwardly from one of the slots of said inner coil, and an outer coil of approximately twelve turns wound through slots outside of and immediately adjacent said slots carrying said intermediate coil, and wherein said direct current windings are each constituted as a first coil of approximately six turns attached to a first commutator bar, wound through the outside slots of eight adjacent slots and connected to a second commutator bar, and a second coil of approximately six turns connected to a commutator bar adjacent said first commutator bar at a side thereof toward which said commutator rotates, wound through the same slots as said first coil and connected to a commutator bar adjacent said second commutator bar at said side thereof toward which said commutator rotates.

References Cited in the file of this patent

UNITED STATES PATENTS

| 264,659 | Edison | Sept. 19, 1882 |
| 841,215 | Andews | Jan. 15, 1907 |
| 1,577,337 | McCormick | Mar. 16, 1926 |
| 2,478,289 | Lemon | Aug. 9, 1949 |
| 2,689,921 | Tardel | Sept. 21, 1954 |
| 2,796,580 | Maggs | June 18, 1957 |
| 2,891,213 | Kern | June 16, 1959 |